United States Patent
Parkinson et al.

(10) Patent No.: US 7,113,905 B2
(45) Date of Patent: Sep. 26, 2006

(54) METHOD AND APPARATUS FOR DETERMINING UNBOUNDED DEPENDENCIES DURING SYNTACTIC PARSING

(75) Inventors: David J. Parkinson, Seattle, WA (US); Michael Calcagno, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 927 days.

(21) Appl. No.: 10/028,228

(22) Filed: Dec. 20, 2001

(65) Prior Publication Data

US 2003/0120479 A1   Jun. 26, 2003

(51) Int. Cl.
G06F 17/27 (2006.01)
G06F 17/28 (2006.01)

(52) U.S. Cl. .............................................. 704/9; 704/1
(58) Field of Classification Search .................... 704/1, 704/4, 9
See application file for complete search history.

(56) References Cited

U.S. PATENT DOCUMENTS

| | | | |
|---|---|---|---|
| 4,887,212 A * | 12/1989 | Zamora et al. ............... | 704/8 |
| 5,146,406 A * | 9/1992 | Jensen ......................... | 704/9 |
| 5,384,893 A * | 1/1995 | Hutchins .................... | 704/267 |
| 5,680,628 A * | 10/1997 | Carus et al. .................. | 704/1 |
| 5,694,523 A * | 12/1997 | Wical .......................... | 706/45 |
| 5,715,468 A * | 2/1998 | Budzinski .................... | 704/9 |
| 5,903,858 A * | 5/1999 | Saraki ......................... | 704/4 |
| 5,966,686 A * | 10/1999 | Heidorn et al. ............. | 704/9 |
| 5,995,922 A * | 11/1999 | Penteroudakis et al. ..... | 704/9 |
| 6,295,529 B1 * | 9/2001 | Corston-Oliver et al. .... | 707/3 |
| 6,393,399 B1 * | 5/2002 | Even .......................... | 704/257 |

OTHER PUBLICATIONS

Hindle, Donald and Rooth, Mats. (1993). "Structural Ambiguity and Lexical Relations." Computational Linguistics, SpecialIssue on Using Large Corpora: I, 19(1):103-120.*

Sauerland, U., & Gibson, E. (1998), "Case matching in Relative Clause Attachment." Paper presented at the eleventh annual CUNY sentence processing conference, Rutgers University, New Brunswick, NJ, Mar. 1998.*

Cardie et al, "A Cognitively Plausible Approach to Understanding Complicated Syntax". In Proceedings of the Ninth National Conference on Artificial Intelligence, 1991, pp. 117-124.*

(Continued)

*Primary Examiner*—David Hudspeth
*Assistant Examiner*—James S. Wozniak
(74) *Attorney, Agent, or Firm*—Theodore M. Magee; Westman, Champlin & Kelly, P.A.

(57) ABSTRACT

A method is provided for identifying non-local relationships between licensing elements in a text segment and a word or phrase external to the text segment during a syntactic parse. Under the method, certain syntactic rules for combining words or phrases with text segments indicate that there is a possibility that the word or phrase being combined with the text segment will fill a gap in a relationship within the text segment. Based on this possibility, the text segment is searched to determine if there are any unfilled gaps in the text segment. Under some embodiments, if an unfilled gap is found, the location of the gap and the role the word or phrase plays in the gap are stored in a data structure associated with the syntactic node formed by combining the word or phrase with the text segment.

10 Claims, 9 Drawing Sheets

OTHER PUBLICATIONS

Baldwin, T. "Relative Clause Coordination and Subordination in Japanese." In Proc. of the Australian Natural Language Processing Postgraduate Workshop, 1998, pp. 1-10.*

S.W. McRoy and G. Hirst, "Race-Based Parsing and Syntactic Disambiguation," Cognitive Science 14:313-353 (1990).

* cited by examiner

TELL
├── DSUB : TOM
├── DIND : MARY
└── DCMP : PUT
    ├── DOBL : WHERE
    ├── DOBJ : BOOK
    └── DSUBJ : PRO
        └── REF : MARY

METHOD AND APPARATUS FOR DETERMINING UNBOUNDED DEPENDENCIES DURING SYNTACTIC PARSING

BACKGROUND OF THE INVENTION

The present invention relates to natural language processing. In particular, the present invention relates to syntactic parsing of text.

A natural language parser is a program that takes a text segment, usually a sentence, of natural language (i.e., human language, such as English) and produces a data structure, usually referred to as a parse tree. This parse tree typically represents the syntactic relationships between the words in the input segment.

In general, natural language parsers build the parse trees by applying syntax rules to the input text segment. Parsers apply these rules in either a "top-down" or a "bottom-up" manner.

In a bottom-up parser, all of the possible parts of speech for the individual words of the input text are first identified to form a set of word tokens. The parser then attempts to combine the individual word tokens into larger syntactic structures, such as noun phrases and verb phrases, by applying syntax rules to the tokens. The resulting larger structures represent candidate nodes for the parse tree. The parser continues to try to build larger and larger structures by applying syntactic rules to previously identified candidate nodes. A full parse is achieved when a node spans the entire text segment.

Many syntax rules encode grammatical relations between the nodes that they combine into a larger segment. For instance, in the sentence "Joe likes Mary", the syntax rule which combines the verb phrase "likes" with the noun phrase "Mary" to form a larger verb phrase will also identify the noun phrase as the direct object of the verb phrase. However, relationships between nodes that do not appear near each other are typically not identified in the parse. For instance, in the question "Who does Joe like?", the word "who" is interpreted as the direct object of the verb "like". However, because "who" is separated from "like" by the words "does Joe", most syntactic parsers would typically not identify the non-local relationship between "who" and "like".

In extreme cases, the distance that may be between words that are involved in a non-local relationship is unlimited. Such relationships are known as unbounded dependencies.

Although a valid syntactic parse can be formed without identifying these non-local relationships, the relationships must be identified when constructing a representation of the argument structure, or logical form, for the text. As is well known in the art, a logical form is a more generalized version of the syntactic parse that shows the basic argument structure of the text without being affected by how the components of the argument structure are expressed in the text. Thus, the sentence "I bought the book" and "The book was bought by me" would have the same logical form but different syntactic parses.

In most systems, logical forms are constructed by identifying relationships within clauses of the text, and between any clauses and the clauses that are subordinate to it. Thus, relationships that hold between one clause and a superordinate clause or between an element in one clause and an element in some superordinate clause present an exception to normal logical form processing. To deal with these non-local relationships, the logical form systems must implement special rules that search for relationships that extend beyond clause boundaries.

To overcome this problem, some prior art syntactic parsers introduce empty elements after words in sentences that can be in non-local relationships and that are missing a neighboring word needed to complete a relationship locally. Each empty element is indexed and this index is passed upward in the parse tree as larger structures are built with the empty element. Eventually, the index is used by a rule to link the empty element with the word or phrase that the empty element represents in the parse.

One problem with using empty elements is that it greatly increases the number of hypotheses that must be considered during syntactic parsing, because each empty element represents an additional word that must be parsed.

Thus, a syntactic parser is needed that can identify non-local relationships in an input sentence without increasing the number of hypotheses generated during a parse.

SUMMARY OF THE INVENTION

A method is provided for identifying non-local relationships between licensing elements in a segment of text referred to as a head phrase and a dislocated adjoined segment of text external to the head phrase during syntactic parsing. Under the method, certain syntactic rules for combining text segments indicate that there is a possibility that the dislocated adjunct text segment will fill a gap in a relationship within the head phrase. Based on this possibility, the head phrase is searched to determine if it, or any of its subordinate clauses, contains any unfilled gaps. Under some embodiments, if an unfilled gap is found, the location of the gap and the role the dislocated adjunct segment plays in the gap are stored in a data structure associated with the syntactic node formed by combining the dislocated adjunct segment with the head phrase.

Under the present invention, multiple gaps can be identified for a single dislocated adjunct text segment. In addition, the dislocated adjunct text segment may assume different roles in different gaps.

When used while constructing a logical form, the data structure identifying the non-local relationship can be utilized to quickly identify the appropriate argument structure relationship between the dislocated adjunct text segment and one or more terms in the clause. In cases where there are multiple gaps, a logical relationship can be formed by placing the dislocated adjunct text segment in each of the gaps or by placing the dislocated adjunct text segment in only selected gaps.

DETAILED DESCRIPTION OF ILLUSTRATIVE EMBODIMENTS

Figure 1:
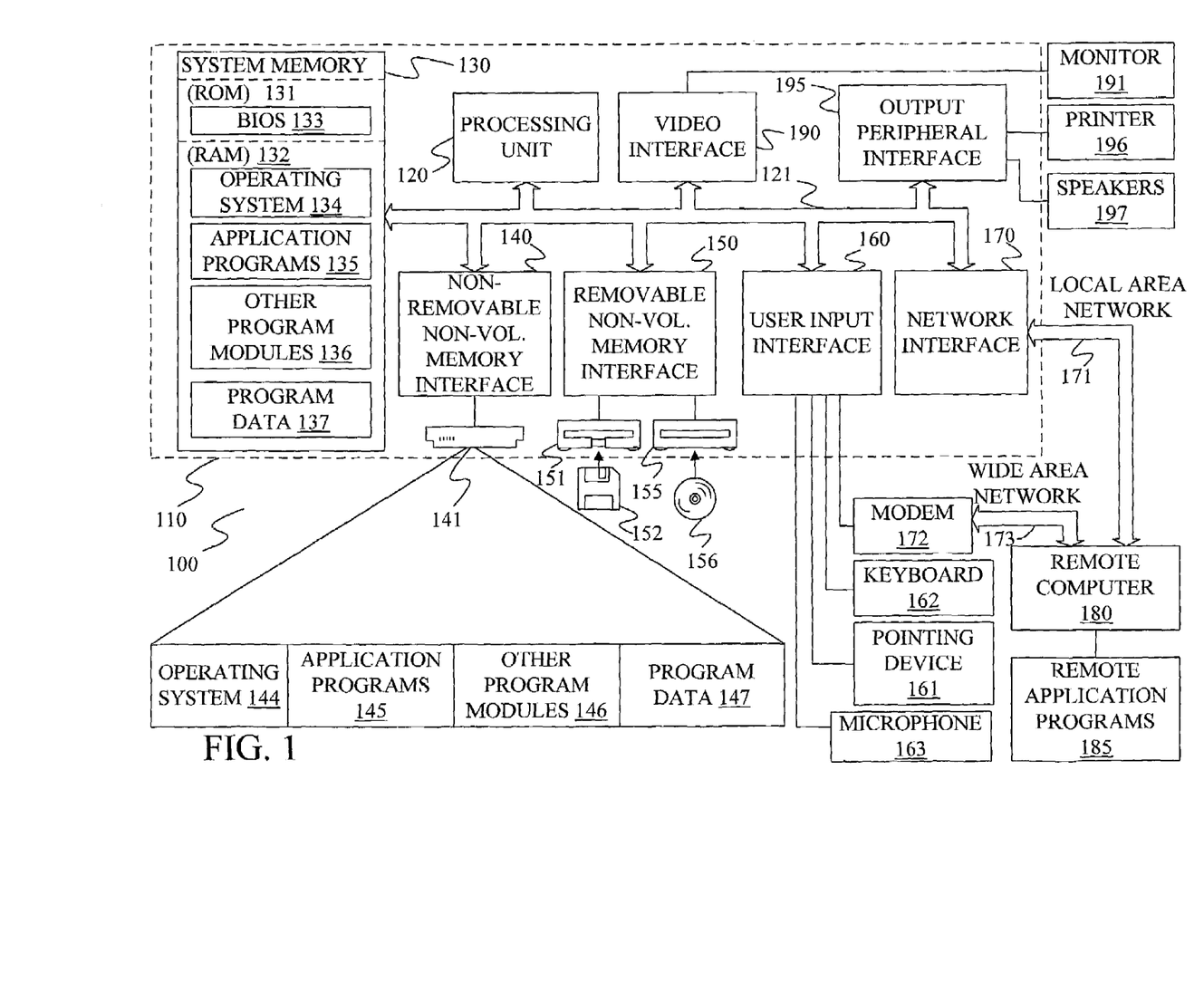
FIG. 1 is a block diagram of a general computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
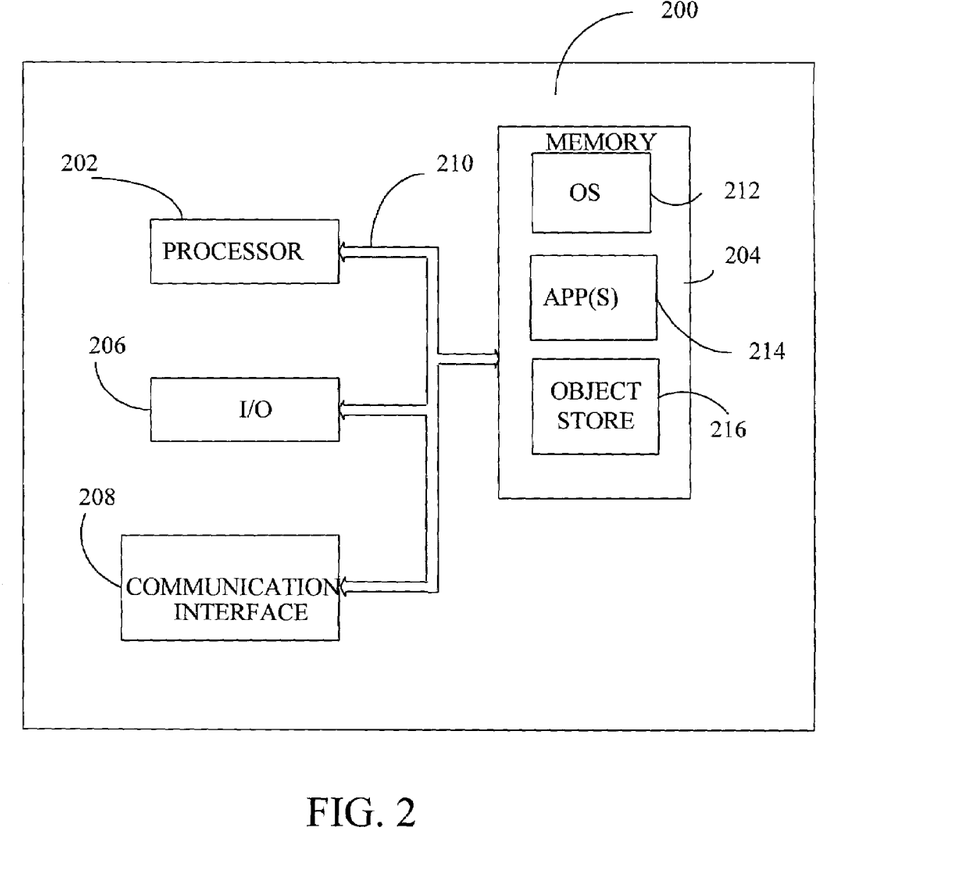
FIG. 2 is a block diagram of a mobile device in which the present invention may be practiced.

FIG. 2 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

Figure 3:
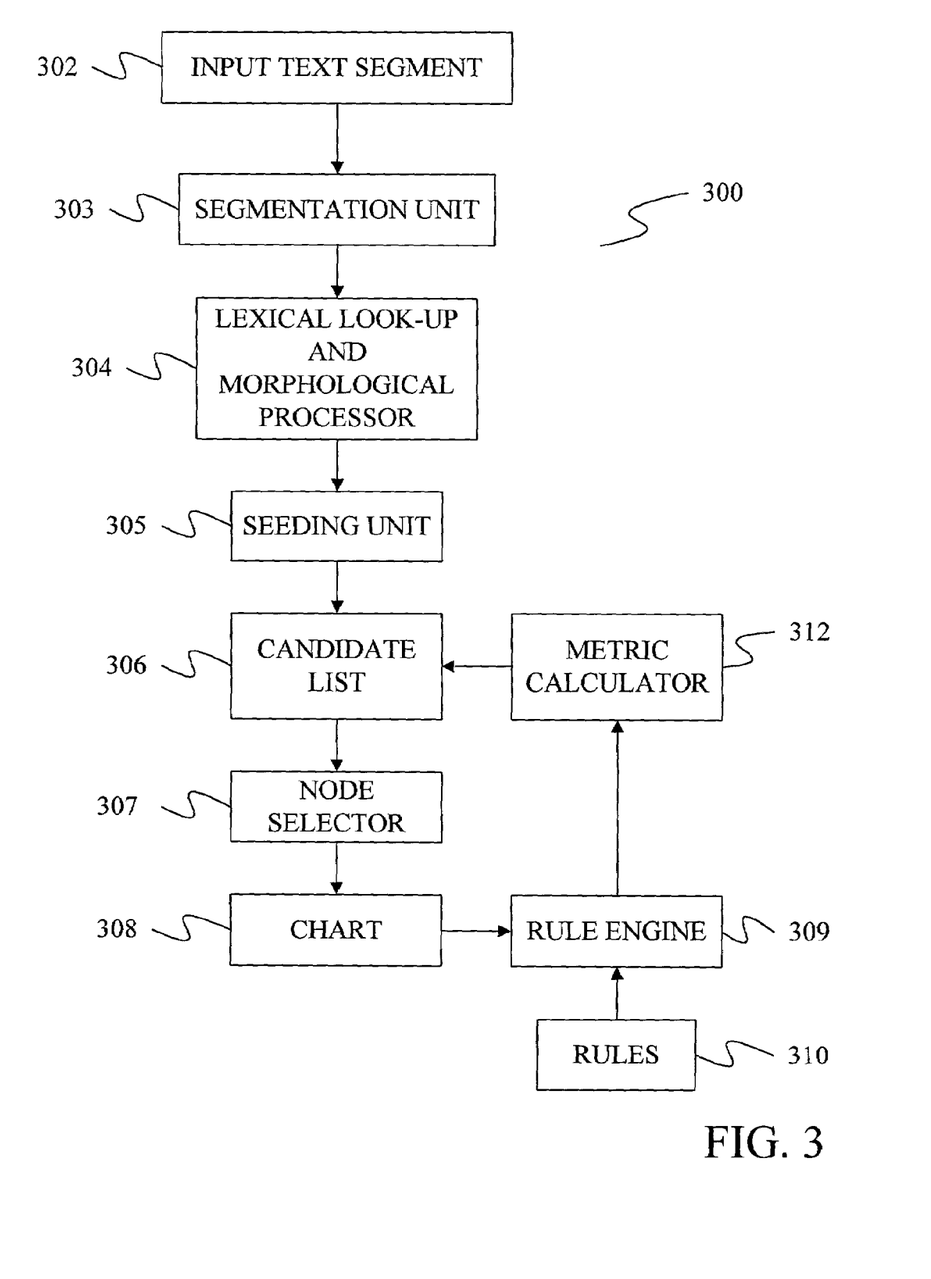
FIG. 3 is a block diagram of a natural language parser.

FIG. 3 provides a block diagram of a parser 300 in which the present invention may be practiced. In parser 300, a segmentation unit 303 divides an input text segment 302 into individual words, which are passed to a morphological processor and lexicon look-up 304 to identify possible parts of speech for each word. Under some embodiments, the morphological processor normalizes the morphological form of the words, if needed, before the words are applied against the lexicon to find the parts of speech. Each word/part-of-speech pair that is identified from the text segment forms a token that is inserted in a candidate list 306 as a starting node by a seeding unit 305.

A parse tree is then constructed through an iterative process. During each iteration, a single candidate node is promoted from candidate list 306 to a node chart 308 by a node selector 307. The promoted node is then tested against rules in a set of rules 310 by a rule engine 309 to see if the promoted node can be transformed into a higher level node using one of the rules. This can occur by applying a unary rule to the promoted node by itself or by applying a rule that combines the promoted node with one or more of the nodes in node chart 308.

During testing, the phrase types of the nodes under consideration are compared to the phrase types required by a rule. For example, a rule may take a verb phrase and a noun phrase to form a larger verb phrase. For such a rule, the promoted node and at least one other node in the node chart must provide the phrase types of noun phrase and verb phrase in order for the conditions of the rule to be satisfied. If the appropriate phrase types are not present in the node chart, the next rule in rule set 310 is examined.

Note that under some embodiments, the rules have additional conditions beyond the phrase types. For example, a rule may require number agreement (singular or plural) between a noun phrase and a verb phrase. In addition, the rule may require a particular phrase level for one or more of the constituent nodes.

When the node chart contains nodes that satisfy a rule, the rule is executed to form a new node. This execution includes determining a set of attributes that describe the structure of the node as well as attributes that define relationships found in the clause represented by the node. For example, the subject, object, indirect object, and lemma form of a head verb in a clause may be determined.

The new node formed by executing the rule may then be scored using a metric calculator 312. The score, if any, assigned to a node, is then used to determine which node to promote next to the chart. Any of a large number of different metrics may be used to score the node. For example, the frequency of the node type, the headword associated with the node, the phrase level of the node and the syntactic history of the node may all be used.

The scored node is inserted into candidate list 306. Under some embodiments, candidate list 306 is sorted based on the score of each node, so that the node with the highest score is at the top of the candidate list. At the beginning of the next iteration, this top-most candidate node is promoted to the node chart.

The iterations described above continue until one or more nodes are formed in node chart 308 that span the entire input segment.

Under embodiments of the present invention, a method is provided for identifying non-local relationships between words during a syntactic parse without adding empty elements to the parse. One such method is shown in the flow diagram of FIG. 4, which is discussed below with reference to a parse tree shown in FIG. 5 for the sentence "Where did Tom tell Mary to put the book?"

Figure 4:
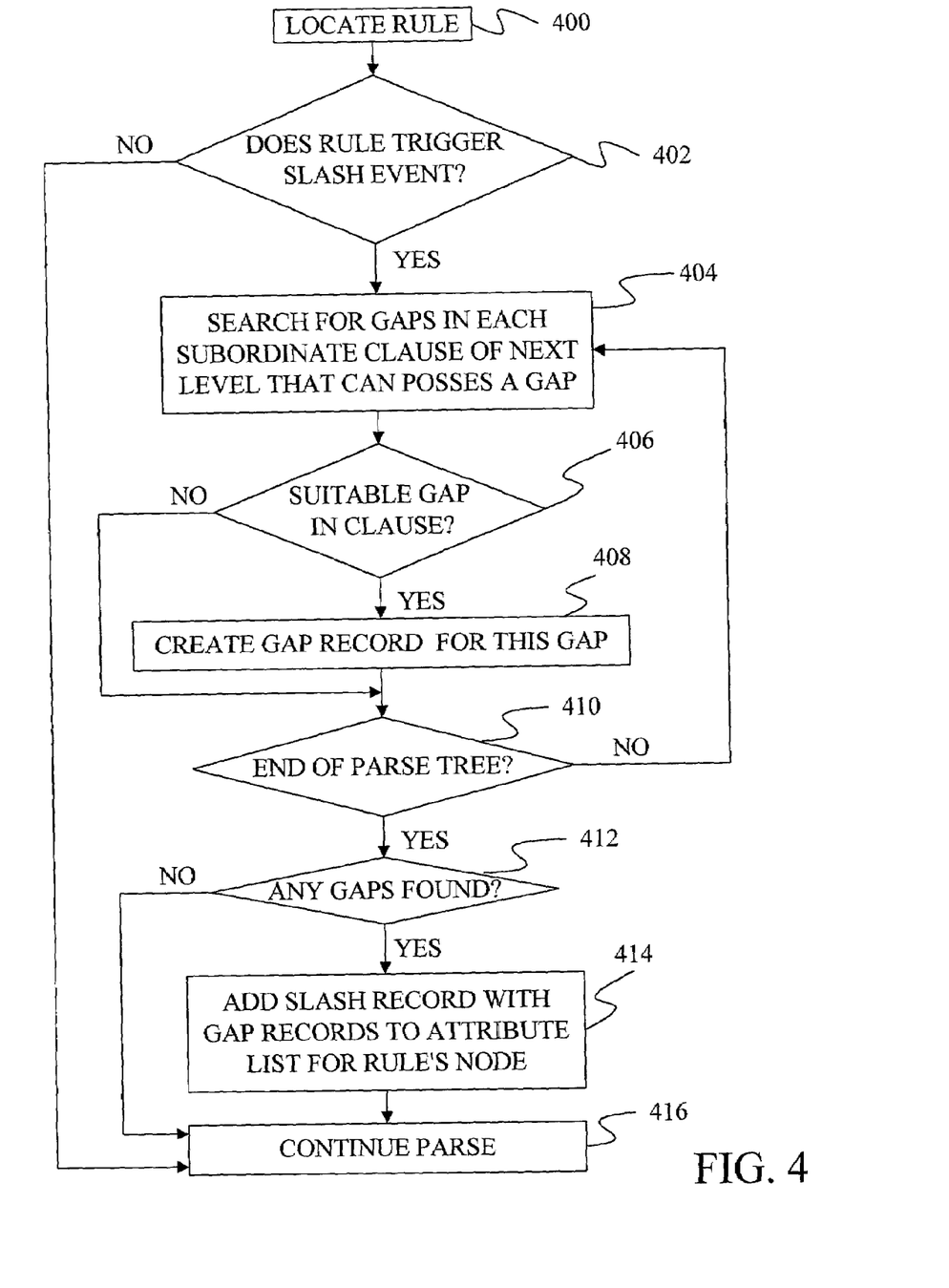
FIG. 4 is a flow diagram of a method of identifying non-local relationships under an embodiment of the present invention.
Figure 5:
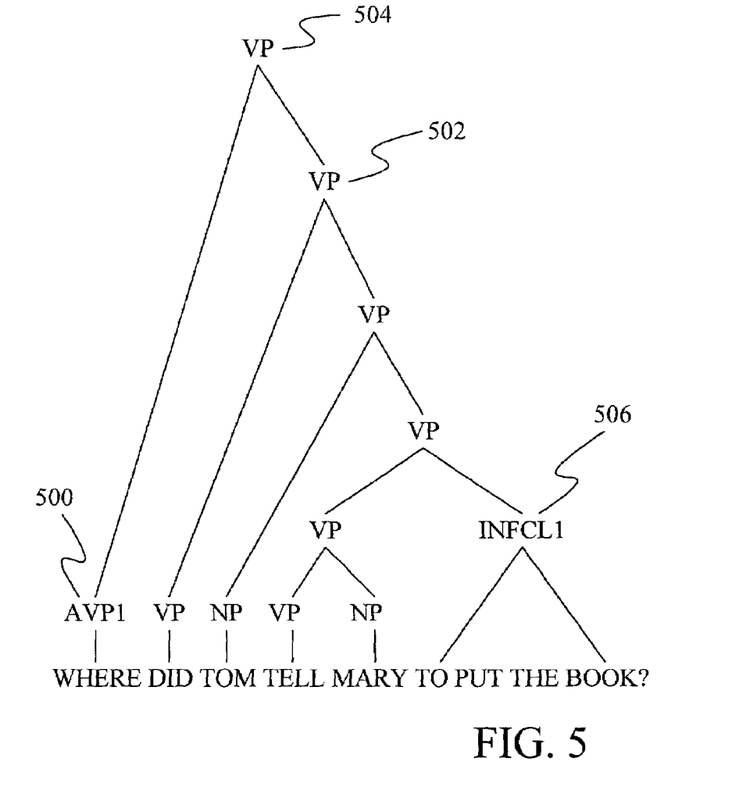
FIG. 5 is an example of a syntactic parse structure.

The flow diagram of FIG. 4 represents steps performed by rule engine 309 during the parse of the sentence. It begins at step 400 where rule engine 309 locates a rule for combining at least two tokens in chart 308. For example, it locates a rule for combining adverbial phrase (AVP) token 500 for the word "Where" and verb phrase (VP) token 502 for the phrase "did Tom tell Mary to put the book?" Implementation of this rule would result in a new token node 504, which is a verb phrase token. Because the resulting token node 504 is a verb phrase, which is an extension of token node 502, we consider token node 500 to be the adjunct of this verb phrase.

At step 402, the rule engine determines whether the located rule is associated with a non-local relationship. In particular, the rule engine determines if one of the tokens being applied to the rule can at times be used to complete or further a non-local relationship. This can be done by examining properties of the tokens such as their parts of speech, tense, and so forth. If one of the tokens is capable of forming part of a non-local relationship, the rule is said to trigger a "slash" event. In addition, the token that satisfies a non-local relationship is said to be a "filler" that is placed in a "gap" in the non-local relationship, where the gap is defined as requiring a token that is capable of assuming a particular role in the non-local relationship. Note that a token can represent a segment of one or more words. Thus, the filler can be a single word or a phrase. Also note that in some embodiments the filler can be constructed by combining two or more tokens.

Examples of sentence structures that will trigger a slash event include questions or clauses that begin with a "Wh" word such as "What", "Who", "Whom", "Where", or "Which"; relative clauses such as "The man that I consider foolish"; clauses with passivization such as "Tom was seen leaving"; clauses with topicalization such as "Beans I like"; clauses with tough constructions such as "Sue was tough to get to know"; Romance language clauses with clitic climbing in which pronouns in sentences are moved forward in the sentence to be combined with a verb in a higher clause such as the French phrase "Je l'ai vu partir"; and clauses that exhibit raising such as "He seems to be a fool", where "he" is actually the subject of the verb "be" and not "seems".

Note that the above list simply provides a set of example sentences and clauses that can trigger a slash event. Other structures and other examples of these structures may be used within the context of the present invention. In general, a slash event can be triggered for any structure that tends to move a token away from a text segment containing some word or phrase with which the token forms a relationship. Also note that not all of the structures listed above need to be associated with a slash event.

If the current rule triggers a slash event at step 402, a search is begun at step 404 to find all of the gaps where the filler token could be placed to satisfy a non-local relationship. Under one embodiment, this search is performed in a top-down manner by examining the various levels of clauses in the text, beginning with the top clause in the segment that is being combined with the filler token. Thus, in FIG. 5, this search begins at the clause represented by node 502. Note that in other embodiments, the search can be performed using different linguistic groupings such as phrases or individual words.

At step 406, rule engine 309 determines whether the current clause contains an unfilled gap. In other words, rule engine 309 determines whether the clause is missing one or more items. To do this, most embodiments examine lexical information associated with the head of the clause, which is referred to generically as the licensing element of the clause.

For example, for a clause that is a verb phrase or infinitive clause, the main verb in the clause is the head of the clause and the lexical information for the main verb of the clause is used. For a prepositional phrase, lexical information about the preposition is used. Note, the licensing element does not need to be a single word but instead can be a phrase. Typically, the lexical information for the licensing element indicates the types of items that are allowed or required to be present in the clause. For example, for a clause with a transitive verb such as "tell" at its head, the lexical information would indicate that tell can be combined with a direct object and an infinitive clause.

Using the lexical information for the licensing element of the clause, potentially missing items are identified for the clause. The syntactic category of the filler is then compared to the missing items to determine whether the filler could assume the role required by the missing item. For instance, if the filler item has a syntactic category of noun phrase and the missing item is a modifier, the filler item could not assume the role required by the missing item. However, if the missing item was an indirect object, the noun phrase filler could assume the role of the missing item. If the filler can assume the needed role, the missing item is considered a suitable gap for the filler.

When a suitable gap is found in a clause in step 406, a gap record is generated for the gap at step 408. Under one embodiment, each gap record such as gap record 600 of FIG. 6, includes a REALIZED IN field such as field 612, a SLASH ROLE field such as field 614, and a BITS field such as field 616. When a gap record is created, the identity of the parse node for the clause that contains the gap is placed in the REALIZED IN field and the role that the filler plays in the gap is inserted in the SLASH ROLE field. Under most embodiments, the roles placed in the SLASH ROLE field track roles used to construct a logical form representation of the text. Examples of slash roles include subject, object, indirect object, modifier and oblique, which correspond to logical form attributes of DSUB (deep subject), DOBJ (deep object), DIND (indirect object), MODS (modifier), and DOBL (deep oblique). Note, these are only examples of the slash roles, and additional slash roles are possible. In addition, in other embodiments, the slash roles do not necessarily correspond to a logical form attribute.

Figure 6:
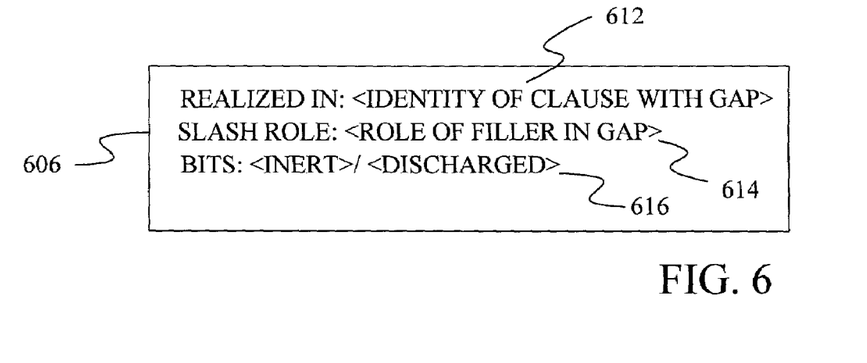
FIG. 6 is an example layout of a gap record under one embodiment of the present invention.

Under one embodiment, BITS field 616 of each gap record includes two bit values. One of the bit values represents an INERT flag that is used by rule engine 309 to indicate to latter processing stages, such as logical form processing, that this gap record should not be used to form a non-local relationship. Rule engine 309 sets this flag when there are more than one possible gap records and some other gap record provides a better gap for the filler.

BITS field 616 also includes a DISCHARGED flag, which is set by the logical form processor during construction of the logical form. This flag allows the logical form processor to track which gap records it has already used in creating the logical form.

Once the gap record has been constructed for a clause, or if there are no more suitable gaps within the current level of clauses, the parse tree is examined at step 410 to see if there is a lower level of clauses in the parse tree that have not been examined yet and that are capable of containing a gap. Under one embodiment of the present invention, a list of clauses that cannot contain gaps is used to determine if the search for gaps should continue at a lower level. In particular, tensed "WH" clauses have been identified as not being able to contain useful gaps and therefore are not searched. In addition, under one embodiment of the present invention, clausal modifiers such as present or past participle clauses are not examined for possible gaps.

If there are lower level clauses, the search for clauses continues at the next lower level by returning to step 404. Steps 404, 406 and 408 are then repeated for the new level of clauses.

Note that multiple gaps can be found within a single level of clauses and across different levels of clauses. For a single filler, each of the suitable gaps that is found is used to create a gap record that is placed in a slash record for the filler. Also note that in different gaps, the same filler may assume different roles. For example, a filler that is in the adverbial phrase category may assume the role of modifier in some gaps and oblique in other gaps.

In the example of FIG. 5, steps 404, 406, 408 and 410 are used to first search for a gap in the clause "did Tom tell Mary to put the book?", which is represented by node 502. The head of this clause is the transitive verb "tell". Using the lexical information for "tell" at step 408, rule engine 309 determines that, among other possible argument structures, "tell" licenses an object and an infinitive clause complement. For clause 502, the object role is filled by the noun phrase "Mary", and the infinitive clause is filled by infinitive clause 506, which represents "to put the book." However, all clauses admit one or more optional modifiers, which are not directly licensed by the verbal head of the clause. There is thus a potential modifier gap in this clause. To determine whether this gap is suitable for the filler word "where", the modifier role is compared to the syntactic category of "where", which in this case is an adverbial phrase. Since an adverbial phrase can assume the role of a modifier, the gap provided by the modifier role is determined to be suitable for the filler "where" at step 406 and a gap record is created for the modifier role at step 408.

The gap record for the modifier role is set by assigning the identity of verb phrase node 502 to the REALIZED IN field and the modifier tag to the ROLE field. The INERT and DISCHARGED flags are set to indicate that the gap record is not inert and that the gap record has not been discharged.

At step 410, the parse tree of FIG. 5 is examined and it is determined that there are additional levels of clauses that have not been examined yet. In particular, infinitive clause 506, which is a subordinate clause of clause 502, has not been examined. The process of FIG. 4 therefore returns to step 404 to search for gaps in infinitive clause 506.

Upon returning to step 404, the process of FIG. 4 determines that the head of that clause is the verb "put", which licenses an object and an oblique locative phrase. In infinitive clause 502, the object role is satisfied by the word "book" but the oblique role (where to put the book) is not satisfied. As such, the oblique role represents a possible gap for the filler "where".

At step 406, the syntactic category of the word "where" is compared to the oblique role to determine if the word "where" can assume the oblique role for the gap. Since "where" is an adverbial phrase, and an adverbial phrase can assume an oblique role, this gap in the infinitive clauses is considered suitable for the filler word "where". As such, a second gap record is added to the slash record for the word "where". In particular, a gap record with a REALIZED IN field set to infinitive clause 506 and a SLASH ROLE field set to "oblique" is added to the slash record.

After the second gap record has been added at step 408, the parse tree is examined to determine if there are additional clause levels to be examined. For the parse tree of FIG. 5, infinitive clause 506 is the bottom clause level so the process of searching for gaps for the current filler word ends.

Figure 7:
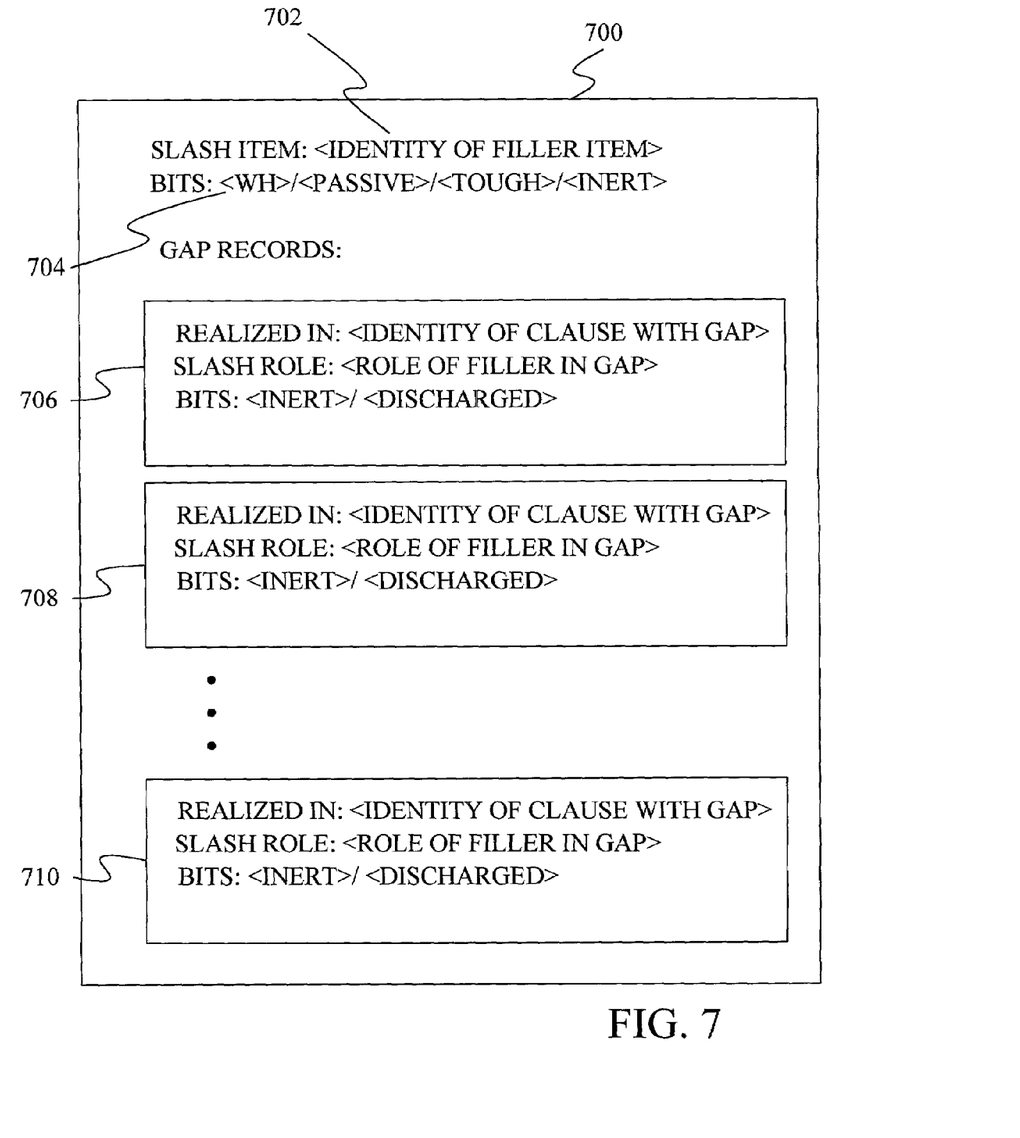
FIG. 7 is an example layout of a slash record under one embodiment of the present invention.

We now pass to step 412, where the process of FIG. 4 checks to see if any gap records were produced during the downward traversal of the parse tree. If any gap records were produced, then a new slash record is created at step 414 and this new slash record is added to a list of attributes associated with the node formed by the rule. FIG. 7 provides a diagram of the contents of one embodiment of a slash record 700 of the present invention. When slash record 700 is first constructed, slash item field 702 is filled with the identity of the token that may act as a filler according to the node's rule. For example, in FIG. 5, token 500 would be identified as being able to act as a filler in the rule that forms node 504, because the adverbial phrase "Where" can be placed as a filler in certain non-local relationships. Thus, the identity of token 500, which would be AVP1, is inserted in slash item field 702.

In addition, one or more bits in a bit field 704 are set for slash record 700. Under some embodiments of the invention, these bits include a <WH> bit that indicates whether the relation between the filler and the gap or gaps is of type "WH" (therefore potentially unbounded), a <PASSIVE> bit that indicates whether the relation between the filler and the gap or gaps is of type "PASSIVE" (thereby limiting the distance between the filler and gap), a <TOUGH> bit that indicates whether the relation between the filler and the gap or gaps is mediated by a so-called "tough" adjective like "tough", and an <INERT> bit that is used by rule engine 309 to indicate to later components that this slash record cannot be used in a favored construction and thus can be ignored during later processing. Typically, the INERT flag is not set until after the processing associated with FIG. 4 has been completed, at which point, rule engine 309 generally has enough parsing knowledge to make a determination as to the appropriateness of identifying the node as triggering a slash event.

The gap records created in step 408 are then added to the slash record. For example, in FIG. 7, gap records 706, 708 and 710 have been added to slash record 700. Those skilled in the art will recognize that although the contents of the gap records are shown within the slash record in FIG. 6, the contents of the gap records may be located outside of the slash record if a pointer to the gap records is placed within the slash record.

In some embodiments, the process of adding a slash record and searching for gaps is performed when executing the rule as part of identifying the structural attributes of the new node formed by the rule. In other embodiments, the search for gaps is performed before executing the rule. By doing the search before executing the rule, the rule can be prevented from executing if there are no appropriate gaps for the filler word. This will help to reduce the amount of computation time wasted on syntactically processing nodes that will not produce a workable logical form. Under one embodiment, only certain types of slash events, such as "WH" and "Passive" slash events are determined before the rule executes. For other slash events, the slash record and the search for gaps is performed as part of executing the rule.

In the prior art, a single filler item was only associated with a single gap. However, since the present invention allows multiple gaps to be identified for a single slash record, it is possible to associate a single filler item with multiple gaps. For example, for the question "What did Mary buy and John return?", the present invention would generate a slash record for the filler term "what" that would include two gap records: one for the "Mary buy" clause and one for the "John return" clause. In both of the gap records, the term "what" would assume the role of direct object. Thus, the slash record would indicate that the single filler item completes two non-local relationships in the sentence. Such one-to-many relationships were not as easily identified in the past.

In addition, under embodiments of the present invention, a filler item in a one-to-many relationship with gaps in a sentence can assume different roles in each gap. For example, for the sentence "Who did you kiss and tell to leave?", the present invention would generate a slash record for the word "who" that would include two gap records. In one gap record for the clause "you kiss", the role of the filler "who" would be identified as a direct object. In the second gap record for the clause "tell to leave", the role of "who" would be identified as an indirect object.

Under some embodiments of the invention, the slash record information contained in the attribute list for a parse node is used by metric calculator 312 to determine a score for the likelihood that the node will be contained in a final parse of the sentence. Under some embodiments, this score is based on training data that includes slash record information for properly parsed text. Thus, the training data provides a probability that a particular node will occur in a final parse when the node's attribute list contains certain types of slash items and gap records.

Under further embodiments of the present invention, the slash records in the attribute list of the parse are used as part of a method of generating a logical form from the syntactic parse. Under these methods, the slash records are used with a set of special attributes, herein referred to as logical form interface attributes, that are set during the syntactic parse. Most of the logical form interface attributes stand in a one-to-one relationship with a logical form attribute. For example, a SUBJECT interface attribute maps to a DSUB logical form attribute.

Figure 8:
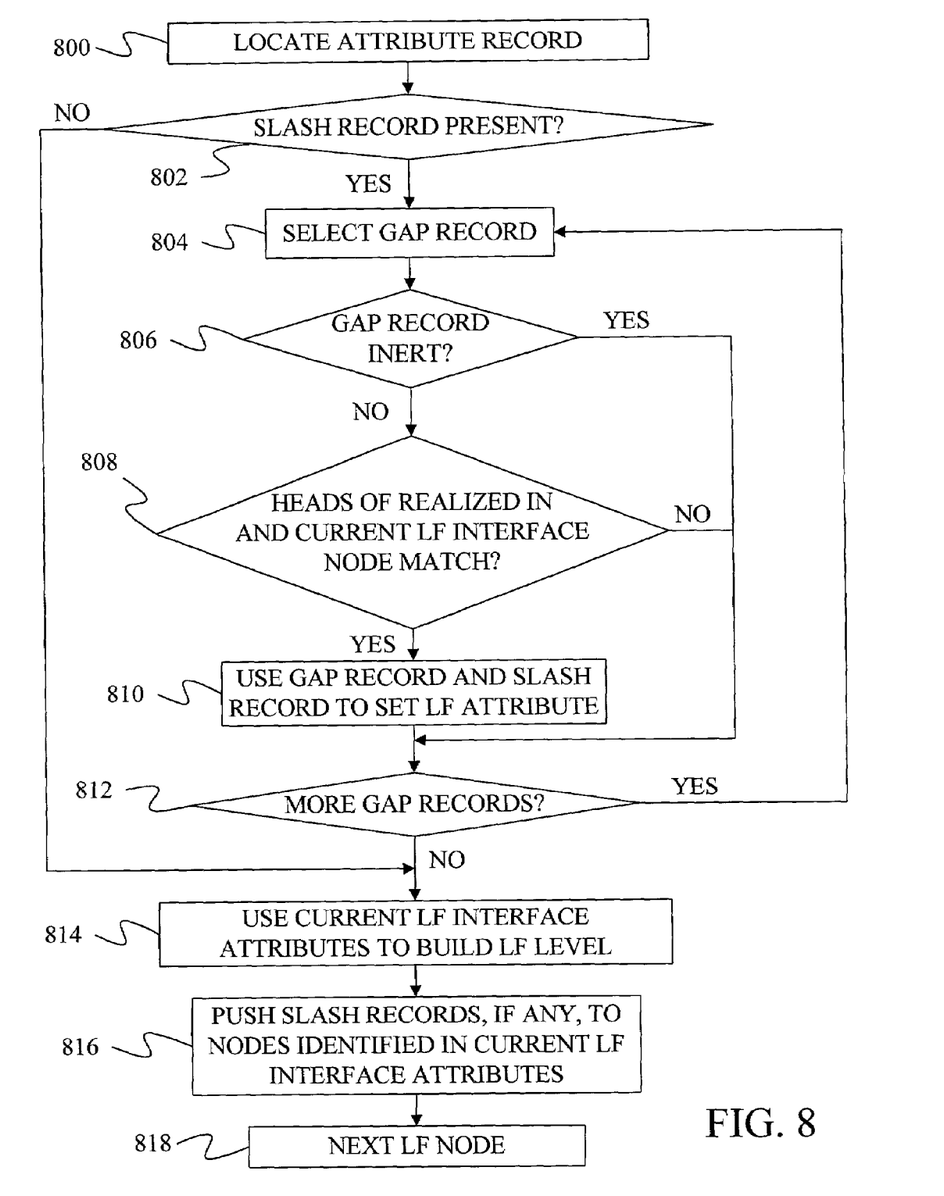
FIG. 8 is a flow diagram of a method of constructing a logical form using the slash records of the present invention.

A method for constructing a logical form under one embodiment of the present invention is shown in the flow diagram of FIG. 8.

To begin construction of the logical form, the syntactic attribute list for the top clause of the syntax parse is retrieved at step 800. The retrieved record is examined at step 802 to determine if it has a slash record. If it has a slash record, processing continues at step 804 where the first gap record in the slash record is selected.

At step 806, the INERT flag of the gap record is examined to determine if the gap record was set to INERT during the parse. If the gap record is not inert, the syntactic node in the REALIZED IN field is retrieved from the gap record and the head of that node is compared to the head of the current node being processed to build the logical form. If the heads of the two nodes match at step 808, the gap record and the slash record are used to set a logical form attribute at step 810. If the gap record is inert at step 806 or if the heads of the REALIZED IN field and the current logical form node do not match, the gap record is not used to set a logical form attribute.

After the current gap record has been processed, the current gap is marked with the DISCHARGED bit, and the slash record is examined to determine if there are additional gap records. If there are additional gap records at step 812, the next gap record is selected at step 804 and steps 806, 808, 810 and 812 are repeated. These steps continue to be repeated until all of the gap records have been processed.

When there are no further gap records to process at step 812, or if no slash record was present for the node, the logical form attributes for the current logical form node are set at step 814 using the logical form interface attributes in the syntactic record associated with the current node. Once these attributes have been set, the slash records, if any, are pushed to each of the logical form nodes that have been identified as logical form values under the current logical form node.

After the slash records have been pushed to the next level of nodes, the next logical form node to be processed is selected at step 818. Note that selecting the nodes to process involves processing each of the logical form nodes that are identified as values in the logical form attribute list.

To illustrate the method of FIG. 8, the construction of a logical form for the syntactic parse of FIG. 5 is described below. This description is based in part on a slash record shown in FIG. 9 that is constructed for node 502 of FIG. 5 using the process of FIG. 4.

Figure 9:
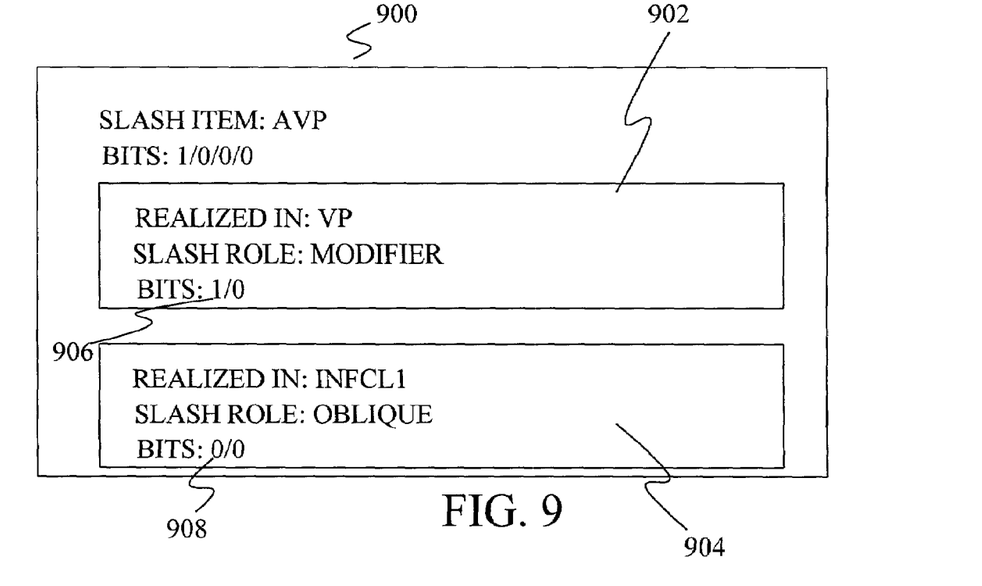
FIG. 9 is an example of a slash record.

The process of constructing a logical form for the syntactic parse of FIG. 5 begins at step 800 where an attribute list for node 504 is retrieved. At step 802, slash record 900 of FIG. 9 is found in the attribute list and at step 804, gap record 902 is selected from the slash record. The INERT flag 906 of gap record 902 is examined at step 806 and is determined to be set to the INERT state. As such, processing continues at step 812 where it is determined that there is an additional gap record to be processed.

Upon returning to step 804, gap record 904 is selected and at step 806 it is determined that INERT flag 908 is not set in gap record 904. As a result, the head of INFCL1, which is the node found in REALIZED IN field 910 is compared to the head of node 504 of the syntactic parse. Since the head of node 504 is the verb "tell" and the head of INFCL1 is the verb "put", the two heads do not match and processing continues at step 812, where it is determined that there are no further gap records.

At step 814, the logical form interface attributes of node 504 are examined to determine if any logical form nodes can be identified from the interface attributes. For node 504, the interface attributes are:

Subject: TOM
lemma: tell
Indirect Object: MARY
Xcomplement: INFCL1

Thus, logical form nodes can be identified for the words Tom and Mary and the INFCL1 clause. This results in the partial logical form of FIG. 10 in which the lemma, tell, is placed as a node 1000 in the logical form. Beneath node 1000, the logical form attribute of DSUB (deep subject) has been set equal to the value for the SUBJECT interface attribute, the logical form attribute DIND (deep indirect object) has been set equal to the value for the INDIRECT OBJECT interface attribute, and the DCMP logical form attribute has been set equal to the value for the XCOMPLEMENT interface attribute.

Figure 10:
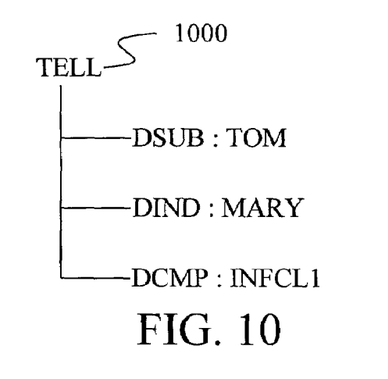
FIG. 10 is an example of a logical form in its first stage of construction.

At step 816, the slash record is pushed down to the attribute list for each of the values identified in the logical form. Thus, the slash record is pushed to the attribute lists for Tom, Mary and INFCL1.

With the partial logical form built, the next logical form node is selected from the partial logical form. In particular, the word Tom is selected as the next logical form node to be processed.

At step 800, the attribute list for the word Tom is retrieved and at step 802 it is determined that the attribute list contains the slash record pushed to it in step 816. Based on this, each of the gap records in slash record 900 is examined to determine whether the head of the word Tom matches the head of the REALIZED IN node of any gap record that does not have its INERT flag set. Since only gap record 904 does not have its INERT flag set, this involves comparing the word Tom to the verb "put". Since these are not the same, the gap record is not used to set a logical form attribute.

At step 814, the attribute list for the word Tom is examined to determine if any logical form attributes may be set based on interface attributes set during the syntactic parse. However, since Tom is a leaf node in the parse tree, there are no logical form nodes that can be identified. As a result, the logical form is not expanded beyond the word Tom. Similarly, because Tom is a leaf node, there are no logical form nodes to which the slash record must be pushed in step 816.

At step 818, the word Mary is selected as the next logical form node to be processed. The word Mary is similar to the word Tom and thus the processing described above for the word Tom is also performed on the word Mary with similar results.

After the word Mary has been processed, INFCL1 is selected as the next logical form node to be processed. Thus, upon returning to step 800, the attribute list for INFCL1 is retrieved and at step 802, the slash record pushed to the attribute list of INFLCL1 is found.

Figure 11:
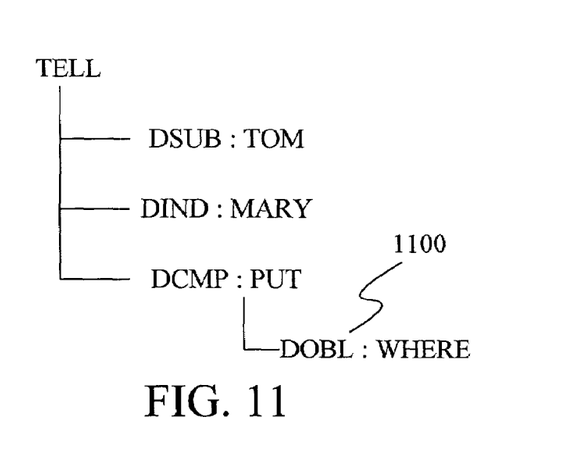
FIG. 11 is an example of a logical form in its second stage of construction.

Steps 804 and 806 are performed on gap record 902 and it is determined that gap record 902 is inert. Steps 804 and 806 are then performed on gap record 904 and it is determined that gap record 904 is not inert. As a result, the head of INFCL1 is compared to the head of the current logical form node, which is also INFCL1. As a result, the heads match and the process continues at step 810 where gap record 904 and slash record 900 are used to set a logical form attribute. In particular, step 810 results in DOBL attribute 1100 of FIG. 11 being set to the word "where".

At step 814, the interface attributes for INFCL1 are examined to determine if a logical form attribute may be set based on the interface attributes. For INFCL1, the interface attributes include:

Object: book

Based on this interface attribute, logical form attribute DOBJ 1200 can be set to book. In addition, because INFCL1 is an infinitive clause, it is known that the subject of the infinitive clause can be found in the noun phrase preceding the clause. Thus, DSUB 1202 can be set as found in FIG. 12.

Figure 12:
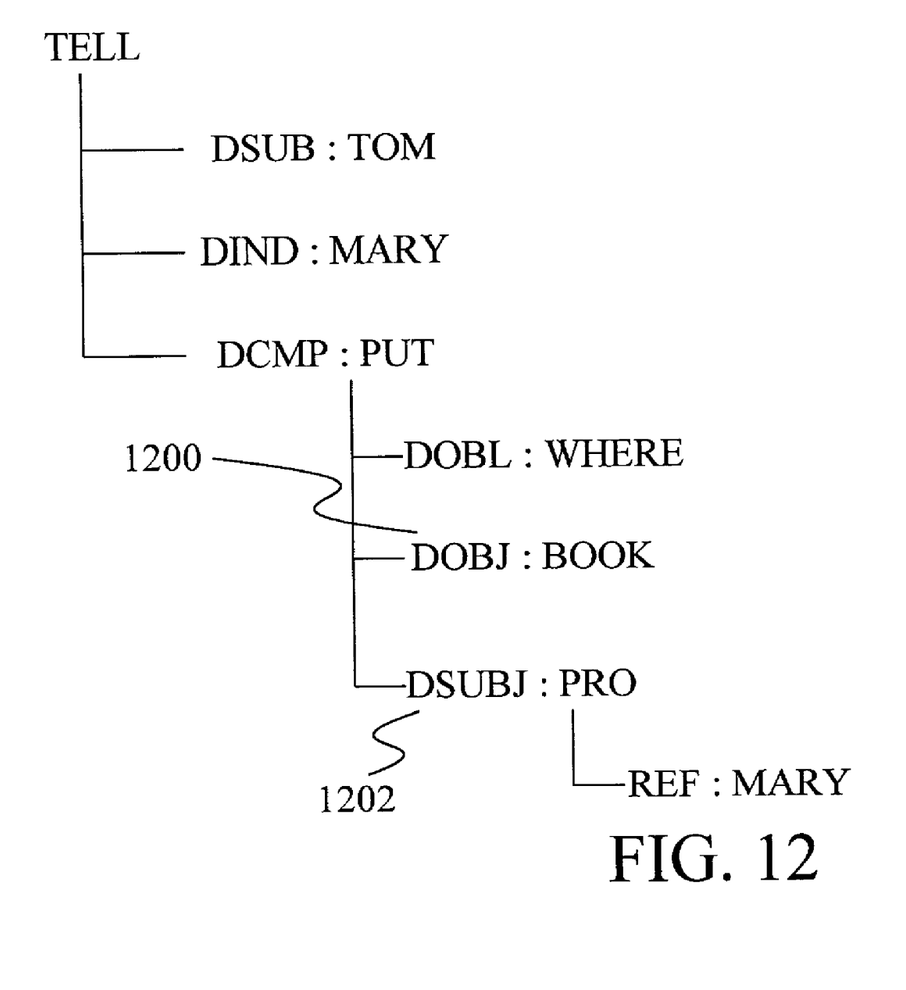
FIG. 12 is an example of a logical form in its third stage of construction.

In the resulting logical form of FIG. 12, it can be seen that the word "where" which is located outside of infinitive clause "to put the book" in the input sentence is moved beneath the "put" node of the logical form. Thus, the non-local relationship present in the input sentence is easily converted into a local relationship in the logical form by using the slash records of the present invention.

Although the present invention has been described with reference to particular embodiments, workers skilled in the art will recognize that changes may be made in form and detail without departing from the spirit and scope of the invention. In particular, although the examples above use a token that represents a single word, in other examples of the invention a token can represent a phrase.

What is claimed is:

1. A method of identifying non-local linguistic relationships between elements of a text, the method comprising:
   identifying a segment of the text during syntactic parsing of the text;
   identifying a token outside of the segment during syntactic parsing of the text;
   based on properties of the token and properties of the segment, determining that the token may have a non-local linguistic relationship to a licensing element in the segment during syntactic parsing of the text, wherein determining that the token may have a non-local linguistic relationship to a licensing element comprises identifying a syntactic rule for combining the segment and the token;
   searching the segment for a licensing element in the segment that is capable of being in a non-local linguistic relationship with the token during syntactic parsing of the text, wherein searching is limited to the segment;
   generating a record for a syntactic attribute list associated with the syntactic parse, the record indicating that the token may have a non-local linguistic relationship to a licensing element in the segment, wherein the attribute list is a hierarchical list that has a hierarchy based in part on a hierarchy of clauses in the text;
   finding at least one licensing element in the segment that is capable of being in a non-local linguistic relationship with the token and adding the location of the licensing element to the attribute list; and
   constructing a logical form based in part on the attribute list.

2. The method of claim 1 wherein searching the segment comprises searching each level of clauses within the segment.

3. The method of claim 1 wherein the step of searching the segment for a licensing element in the segment is performed before executing the syntactic rule.

4. The method of claim 3 wherein the syntactic rule is not executed if a licensing element that is capable of being in a non-local linguistic relationship with the token cannot be found in the segment.

5. The method of claim 1 wherein the step of searching the segment for a licensing element in the segment is performed as part of executing the syntactic rule.

6. The method of claim 1 further comprising adding a role that the token assumes in the non-local linguistic relationship to the attribute list.

7. The method of claim 1 wherein finding at least one licensing element in the segment comprises finding at least two licensing elements and wherein adding the location of the licensing element to the attribute list comprises adding the locations of both licensing elements to the attribute list.

8. The method of claim 7 further comprising for each licensing element found, adding a role that the token is capable of assuming in a non-local linguistic relationship to the attribute list.

9. The method of claim 8 wherein adding a role that the token is capable of assuming comprises adding a first role for a first found licensing element and adding a different role for a second found licensing element.

10. The method of claim 1 wherein constructing a logical form comprises accessing the hierarchical attribute list in a top-down manner.

* * * * *